United States Patent [19]

Makino et al.

[11] Patent Number: 4,880,282

[45] Date of Patent: Nov. 14, 1989

[54] BRAKING SYSTEM WITH APPARATUS FOR CONTROLLING PRESSURE TO BE ACCUMULATED IN ACCUMULATOR FOR BRAKING MOTOR VEHICLE

[75] Inventors: Nobuhiko Makino, Kariya; Kimio Tamura, Anjo; Hiroharu Miyazaki, Toyota; Tomohiko Hosoda, Nagoya; Fumio Nakagawa, Susono, all of Japan

[73] Assignee: Nippondenso Co., Ltd., Kariya, Japan

[21] Appl. No.: 344,480

[22] Filed: Apr. 12, 1989

Related U.S. Application Data

[63] Continuation of Ser. No. 238,234, Aug. 30, 1988, abandoned.

[30] Foreign Application Priority Data

Aug. 30, 1987 [JP] Japan ................... 62-217719
Jun. 2, 1988 [JP] Japan ................... 63-135984

[51] Int. Cl.$^4$ .......................... B60T 8/32; B60T 8/44
[52] U.S. Cl. ........................ 303/116; 303/10; 303/92; 303/110; 303/DIG. 3; 303/DIG. 4
[58] Field of Search ............. 303/DIG. 3, DIG. 4, 303/116, 10–12, 113, 114, 115, 110, 92

[56] References Cited

U.S. PATENT DOCUMENTS

| | | |
|---|---|---|
| 3,788,710 | 1/1974 | Von Grunberg et al. .......... 303/115 |
| 4,215,902 | 8/1980 | Sato et al. ........................ 303/113 X |
| 4,357,054 | 11/1982 | Leiber ............................ 303/116 X |
| 4,428,620 | 1/1984 | Warwick et al. ............. 303/DIG. 3 |
| 4,629,258 | 12/1986 | Resch et al. ......................... 303/92 |
| 4,728,156 | 3/1988 | Burgdorf et al. ......... 303/DIG. 4 X |
| 4,753,492 | 6/1988 | Leiber et al. ................. 303/DIG. 3 |

FOREIGN PATENT DOCUMENTS

| | | |
|---|---|---|
| 3347618 | 7/1985 | Fed. Rep. of Germany . |
| 5316466 | 6/1978 | Japan . |
| 58133945 | 8/1983 | Japan . |
| 61-44062 | 3/1986 | Japan . |

OTHER PUBLICATIONS

ATZ—Automobiltechnische Zeitschrift, vol. 89, No. 6, Jun. 1987, Stuttgart; pp. 325–328.
M. Kahrs: "Elektromotor-angetriebene Hydroversorgungseinheiten für Anwendungen im Kraftfahrzeug".

Primary Examiner—Douglas C. Butler
Attorney, Agent, or Firm—Cushman, Darby & Cushman

[57] ABSTRACT

A braking system of a motor vehicle including an accumulator, being coupled to a to motor-driven pump, for accumulating a hydraulic pressure which is supplied to a braking device to brake a wheel of the motor vehicle and a control valve provided between the accumulator and the braking device for regulating the hydraulic pressure to be applied from the accumulator to the braking device. Also included in the braking system is a control unit for controlling the control valve in accordance with the condition of the wheel. The control unit controls the motor-driven pump on the basis of the control time of the control valve.

15 Claims, 10 Drawing Sheets

BRAKING SYSTEM WITH APPARATUS FOR CONTROLLING PRESSURE TO BE ACCUMULATED IN ACCUMULATOR FOR BRAKING MOTOR VEHICLE

This is a continuation of application Ser. No. 238,234, filed Aug. 30, 1988, now abandoned.

BACKGROUND OF THE INVENTION

The present invention relate generally to braking systems for use in motor vehicles, and more particularly to an apparatus for controlling the hydraulic pressure in an accumulator used in such a braking system.

Generally, braking systems with an anti-skid control system or the like have an accumulator for accumulating hydraulic pressure to be used for the braking operation of the motor vehicle and further have an apparatus of controlling the hydraulic pressure of the accumulator. One example of such an accumulator pressure control apparatus is disclosed in Japanese Patent provisional Publication No. 58-133945, in which the hydraulic pressure in the accumulator is controlled by means of a motor-driven pump associated with a pressure sensor adapted to sense the accumulator pressure. One of problem with such an accumulator pressure control apparatus operated in connection with the pressure sensor is, however, that difficulty can be encountered to accurately keep the accumulator pressure in a predetermined range due to failures of the pressure sensor.

Furthermore, as will be understood with reference to FIG. 1, the conventional accumulator pressure control apparatus is operated such that, as shown by dotted lines A1 and A2, the motor-driven pump is operated in response to the accumulator pressure being fallen down below a predetermined lower limit P2 (time T2) and deenergized when the accumulator pressure reaches a predetermined upper limit P1 by the motor-driven pump operation (time T5), FIG. 1 being a graphic illustration for showing the effect of an accumulator pressure control appratus according to the present invention (which will hereinafter be described in detail) by comparison with the prior art apparatus. Such a pump operation method causes difficulty to quickly stop the pump at the time of termination (time T4) of braking operation or slip control and causes the delay (time T5) of stop of the pump, resulting in generation of noises due to the pump operation between the times T4 and T5.

SUMMARY OF THE INVENTION

The present invention has been developed in order to remove the above-mentioned drawbacks inherent to the conventional accumulator pressure control apparatus.

It is therefore an object of the present invention to provide an accumulator pressure control apparatus of a braking system which is capable of accurately controlling the hydraulic pressure in an accumulator irrespective of failures or the like of a pressure sensor and appropriately controlling the operation of a motor-driven pump so as to prevent the generation of noises after termination of the braking operation.

A braking system for use in a motor vehicle according to the present invention, for achieving the object, comprises accumulator means coupled to motor-driven pump means for accumulating a hydraulic pressure which is supplied to a braking device to brake a wheel of the motor vehicle; control valve means provided between the accumulator means and the braking device for regulating the hydraulic pressure to be applied from the accumulator to the braking device; and control means for controlling the control valve means so as to regulate the hydraulic pressure to the braking device, the control means energizes the motor-driven pump means on the basis of the control time of the control valve means.

That is, the control means is adapted to control the control valve means when, for example, the wheel of the motor vehicle is in a slipping condition and return the wheel to the appropriately driven state. At this time, the control means integrates the control time of the control valve means therefor and operates the motor-driven pump so as to increase the hydraulic pressure in the accumulator when the integrated control time of the control valve means is over a predetermined time. If the control valve means is arranged so as to assume predetermined pressure control modes in accordance with the wheel condition, it is also appropriate to operate the motor-driven pump means when the control time for one of the predetermined pressure control modes is over a predetermined time.

The braking system further comprises pressure sensor means for sensing the hydraulic pressure in the accumulator means and generating a signal indicative of the sensed hydraulic pressure and the control means is responsive to the pressure indicating signal from the pressure sensor means for energizing the motor-drive pump means when the hydraulic pressure in the accumulator becomes below a first predetermined value and for deenergizing it when the hydraulic pressure therein reaches a second predetermined value. Preferably, with the vehicle wheel being in a predetermined condition, the control means energizes the motor drive-pump means when the sensed hydraulic pressure in the accumulator means is below a third predetermined value which is higher than the first predetermnined value.

BRIEF DESCRIPTION OF THE DRAWINGS

The present invention will be described in further detail with reference to the accompanying drawings, in which.

DETAILED DESCRIPTION OF THE INVENTION

Figure 2:
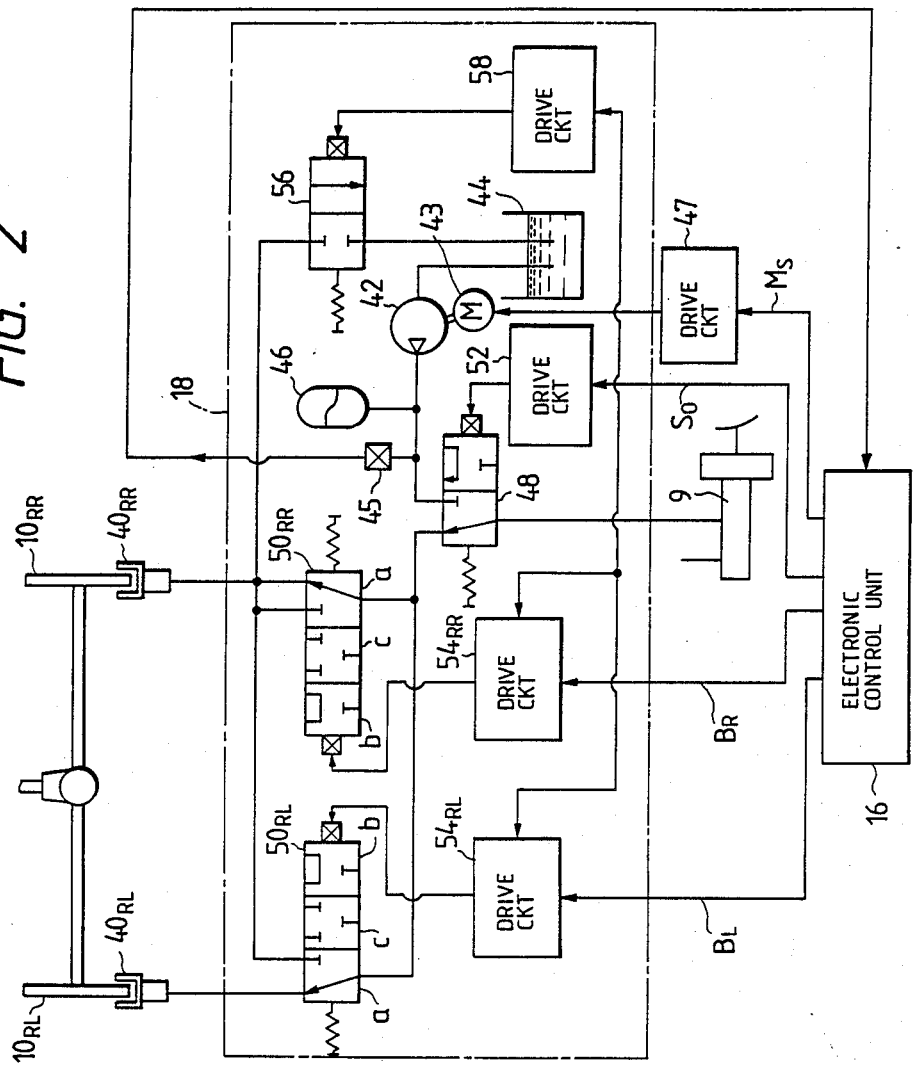
FIG. 2 shows an arrangement of the accumulator pressure control apparatus according to the embodiment of this invention.

Referring now to FIG. 2, there is schematically illustrated an arrangement of an accumulator pressure control apparatus according to an embodiment of the present invention which is incorporated into a braking control system of a motor vehicle. In FIG. 2, the braking control system 18 is arranged so as to operate left and right side braking devices 40RL and 40RR to brake the left and right driven wheels 10RL and 10RR (illustrating only two of the wheels of the motor vehicle) in accordance with control signals So, BL, BR from an electronic control unit 16. The electronic control unit 16 comprises a microcomputer including a central processing unit (CPU), a read-only memory (ROM), a random access memory (RAM), an input/output port (I/O) and so on. The control signals So, BL, BR therefrom are respectively supplied to drive circuits 52, 54RL, 54RR so as to drive a hydraulic-pressure passage change-over valve 48, a left-side hydraulic pressure control valve 50RL and a right-side hydraulic pressure control valve 50RR so that the braking forces applied to the left and right driven wheels 10RL and 10RR by the braking devices 40RL and 40RR are controllable. The hydraulic pressure of an accumulator 46 is accumulated by means of a pump 42 driven by a motor 43, the inlet side of the pump 42 being coupled to a reservoir 44.

The hydraulic-pressure passage change-over valve 48 is a two-position solenoid valve whereby the braking devices 40RL and 40RR are coupled through the hydraulic pressure control valves 50RL and 50RR to the accumulator 46 or a braking master cylinder 9. Normally, the change-over valve 48 takes a position so that the braking master cylinder 9 is coupled to the braking devices 40RL and 40RR, whereby the braking operations of the wheels 10RL and 10RR can be effected by depression of a braking pedal made by the vehicle driver. On the other hand, in response to the control signal So from the electronic control unit 16, the change-over valve 48 is switched by the drive circuit 52 to take another position whereby the braking devices 40RL and 40RR are coupled to the accumulator 46 to allow execution of the anti-skid control, for example. Each of the left and right side hydraulic pressure control valves 50RL and 50RR is a three-position solenoid valve which controls the braking hydraulic pressure applied to the left or right wheel by taking positions a, b, c through the drive circuit 54RL or 54RR in accordance with the control signal BL or BR from the electronic control unit 16 with the change-over vlave 48 being switched to the accumulator 46 side. In this embodiment, the drive circuits 54RL and 54RR are started in response to the control signal So from the electronic control unit 16 so as to control the hydraulic pressure control valves 50RL and 50RR in accordance with the control signals BL and BR therefrom, the control of the control valves 50RL and 50RR being effected until the control signal So is stopped. The braking hydraulic pressure increasing and decreasing control is performed with each of the control valves 50RL and 50RR taking the positions a, b, c in accordance with the pressure increasing or decreasing duty ratio D corresponding to the control signal BL or BR. That is, the time t of increasing or decreasing the braking hydraulic pressure during a predetermined time period T is obtained as $t = D \cdot T$ in accordance with each of the control signal BL or BR so that the control valves 50RL and 50RR are respectively controlled in accordance with the obtained time t for pressure increasing or pressure decreasing.

The electronic control unit 16 outputs the control signal So when one driven wheel 10RL or 10RR becomes in a slipping state at the time of acceleration of the motor vehicle or the like and the slipping amount exceeds a predetermined reference value. The braking control amount of each of the right and left wheels 10RL and 10RR is determined in accordance with the difference between the wheel slipping amount and the predetermined reference value. The braking control system 18 is provided with a pressure sensor 45 for sensing the hydraulic pressure of the accumulator 46 and generating a signal indicative of the sensed hydraulic pressure thereof. The signal therefrom is supplied to the electronic control unit 16 which in turn outputs a drive signal Ms to a motor drive circuit 47 to drive the pump 42 by means of the motor 43 when the hydraulic pressure of the accumulator 46 is fallen down below a predetermined value, whereby the hydraulic pressure of the accumulator 46 is kept to an appropriate value.

Figure 3:
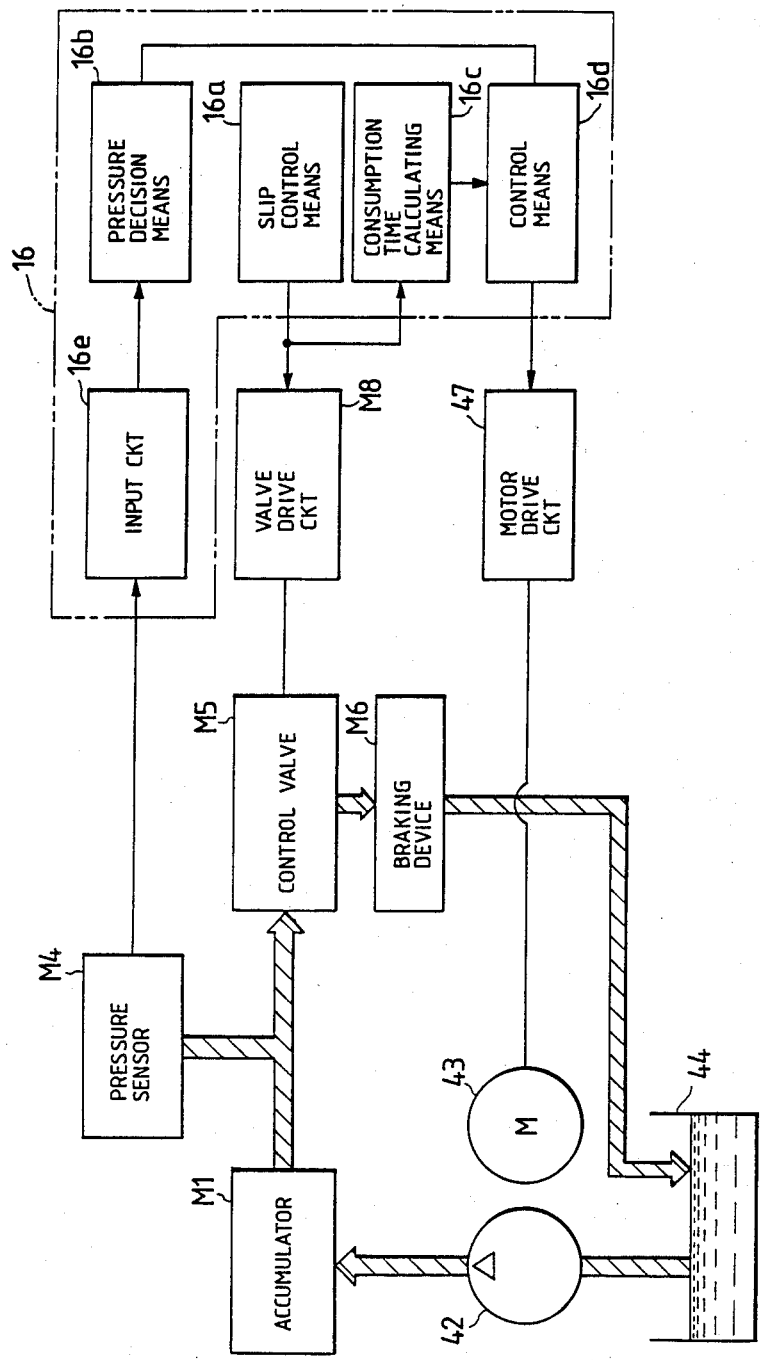
FIG. 3 is a block diagram showing the functional arrangement of the accumulator pressure control apparatus according to the FIG. 2 embodiment.

FIG. 3 is a block diagram useful for easily understanding the arrangement of the accumulator pressure control apparatus according to the embodiment of this invention. In FIG. 3, reference M1 represents the accumulator 46, M4 designates the pressure sensor 45, M5 depicts a control valve means corresponding to the change-over valve 48 and control valves 50RL, 50RR, M6 represents a braking means corresponding to the braking devices 40RL, 40RR, and M8 designates a valve drive circuit means corresponding to the drive circuits 52, 54RL, 54RR. The electronic control unit 16 is provided in function with a slip control means 16a for calculating the slip amount of the driven wheel and so on and outputting the control signals So, BL, BR to the valve drive circuit means M8, a pressure decision means 16b coupled through an input circuit means 16e to the pressure senor M4 to determine the lowering of the hydraulic pressure of the accumulator M1 in accordance with the signal indicative of the accumulator pressure from the pressure sensor M4 and coupled to a control means 16d which in turn energizes the motor drive circuit 47, and a consumption time calculating means 16c for obtaining, or integrating, the time of consumption of the accumulator M1 pressure due to the opening of the control valve means M5 on the basis of the control signals So, BL, BR. The input circuit means 16e is for converting the pressure-indicating signal from the pressure sensor M4 into the corresponding digital signal and the control means 16d is for outputting a drive signal to the motor drive circuit 47 when the obtained consumption time is over a predetermined time.

Figure 4:
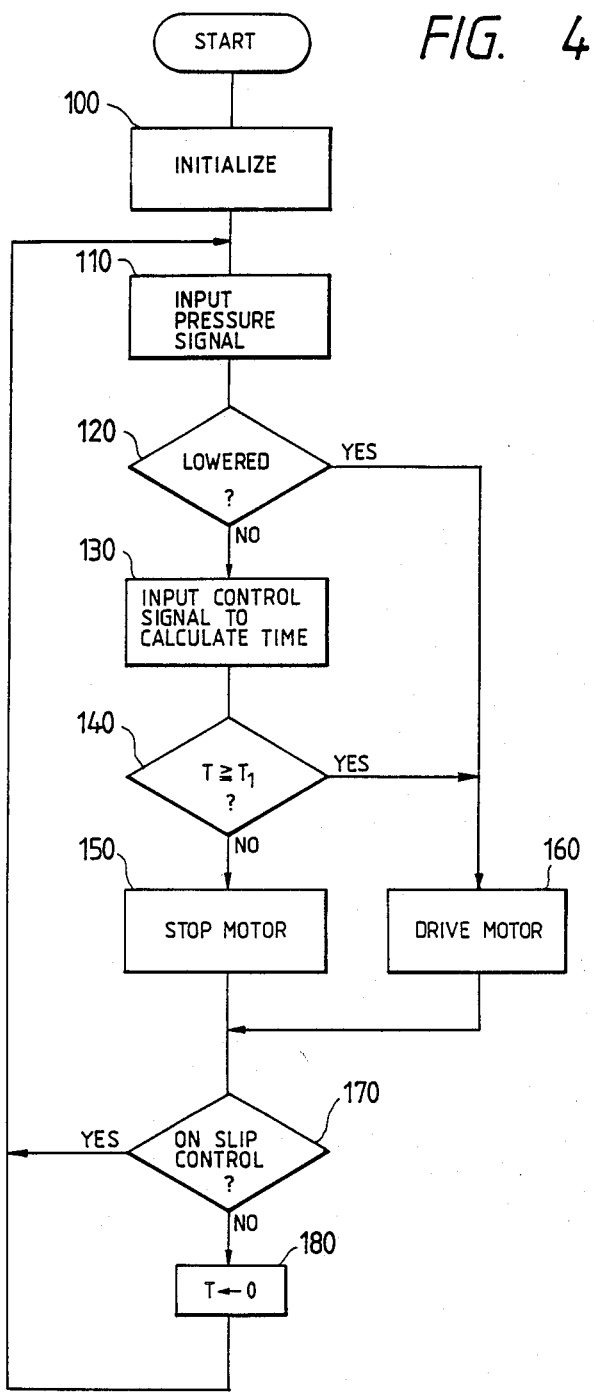
FIG. 4 is a flow chart showing operation executed by an electronic control unit of the accumulator pressure control apparatus of the embodiment.

FIG. 4 is a flow chart showing control executed in the microcomputer of the electronic control unit 16, the control being effected by the CPU in accordance with a program prestored in the ROM. In FIG. 4, in response to turning-on of an ignition switch (not shown) of the motor vehicle, the control starts with a step 100 in which the initialization is executed, for example, various counters are cleared. The initialization step 100 is followed by a step 110 to input a signal from the pressure sensor 45 indicative of the hydraulic pressure of the accumulator 46 and further followed by a step 120 to check whether the accumulator pressure is below a predetermined value or is in the normal pressure state. If the accumulator pressure is below the predetermined value, a step 160 follows to output a motor drive signal. If it is in the normal pressure state, a step 130 follows to indirectly obtain the consumption time of the accumulator pressure on the basis of the control signals So, BL and BR. For example, with the hydraulic-pressure passage change-over valve 48 being switched so that the accumulator 46 is coupled to the braking device side, the consumption time T is calculated on the basis of the times TRL, TRR for which the hydraulic-pressure control valves 50RL and 50RR respectively take the positions a, i.e., as T=TRL+TRR. The consumption time T is integrated at every calculation cycle. After the execution of the step 130, a step 140 is executed in order to check whether the integrated consumption time T is equal to or over a predetermined time T1. If T>T1 indirectly indicating that the accumulator pressure becomes in a pressure-lowered state due to the consumption, the operational flow goes to the step 160 to output the motor drive signal. On the other hand, if T<T1, control advances to a step 150 to stop the outputting of the motor drive signal. In a subsequent step 170, it is checked on the basis of the presence of the control signals So, BL, BR whether the motor vehicle is on the slip control. If it is not on the slip control, a step 180 follows to clear the integrated consumption time T. If so, the operational flow returns to the step 110. Here, the predetermined time T1 may be determined so as to prevent the pump 42 from being driven by accident when the control valves 50RL and 50RR are opened due to a shock of the motor vehicle. For example, the predetermined time T1 is determined to be over about 50 msec. Furthermore, the predetermined time T1 is determined to be sufficiently short (for example, below about 150 msec.) as compared with the time at which the accumulator pressure becomes in the pressure-lowered state, thereby resulting in quickly driving the pump 42.

Figure 1:
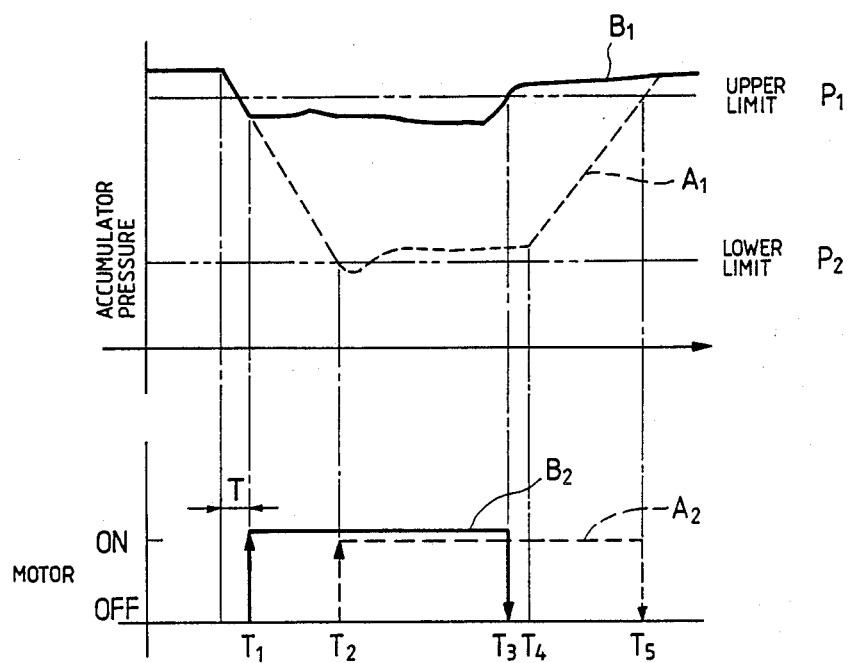
FIG. 1 is a graphic illustration for describing the effect of an accumulator pressure control apparatus according to an embodiment of the present invention.

The effect of this arrangement will be easily understood with reference to FIG. 1. That is, as shown by solid lines B1 and B2, in the case that the accumulator pressure is consumed due to the anti-skid control execution, when the consumption time T of the accumulator pressure from the consumption start becomes equal to or exceeds the predetermined time T1, the pump 42 is driven. Here, the motor drive signal is outputted before the time T2 at which the accumulator pressure becomes in the pressure-lowered state, i.e., below the lower limit P2, and therefore it is possible to quicken the timing of stop of the pump drive up to the time T3, resulting in reduction of the generation of noises Here, in the case that the accumulator pressure is lowered because of no use of the motor vehicle for a long time, the pump 42 is operated in response to the signal from the pressure sensor 45. In the case that this embodiment is additionally employed for the non-driven wheels, the consumption time T is calculated as the sum of the accumulator-pressure consuming times for all the wheels.

Figure 5:
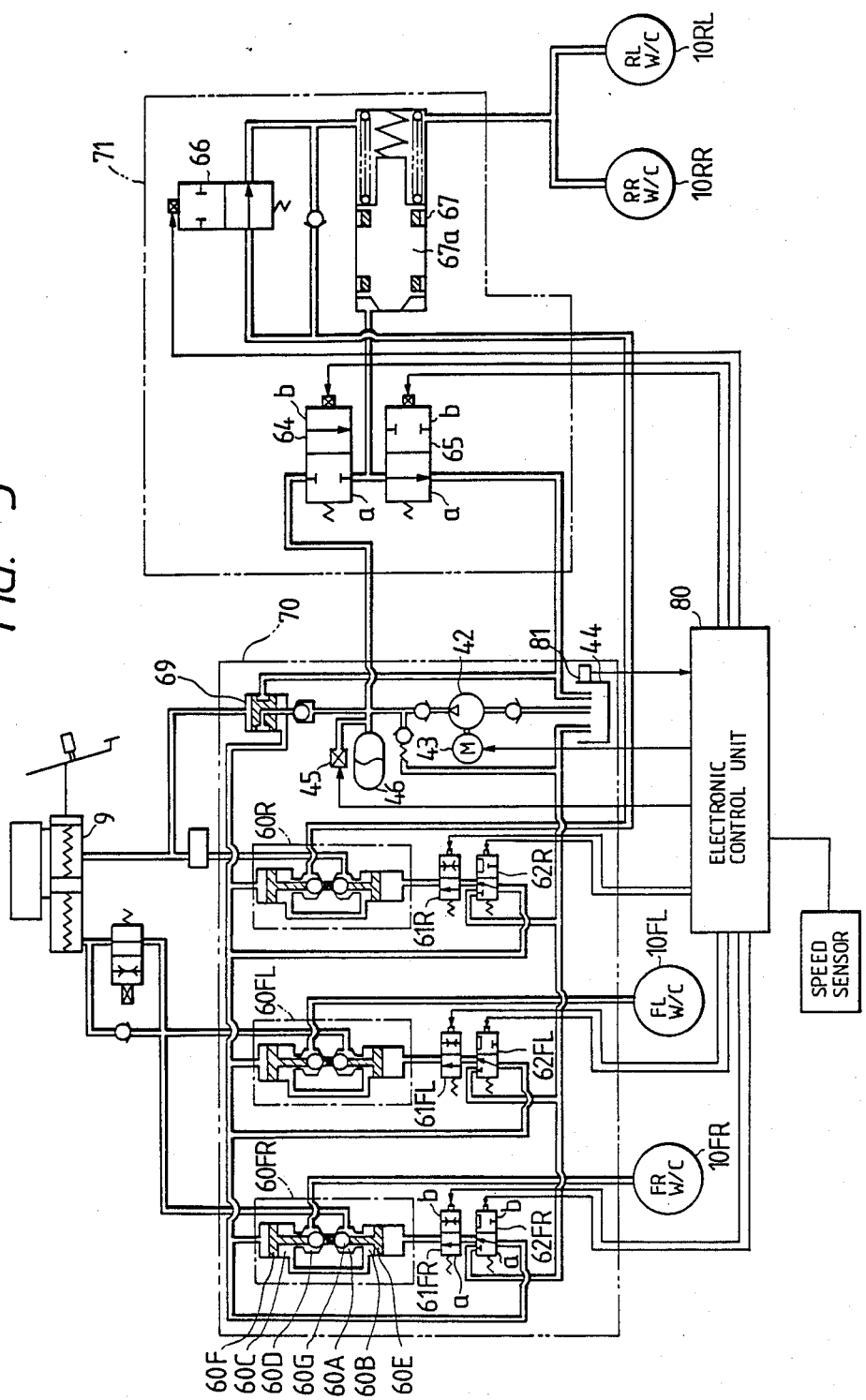
FIG. 5 shows an arrangement of an accumulator pressure control apparatus according to a second embodiment of the present invention.

FIG. 5 is an illustration for describing another embodiment of the present invention and shows a three-channel anti-skid control system 70 for controlling the braking hydraulic pressures to be applied to the front-left wheel 10FL, front-right wheel 10FR and the rear wheels (driven wheels) 10RL, 10RR and a slip control system 71 for preventing the slip of the rear wheels 10RL, 10RR on start of the motor vehicle and the like.

Normally, rapid-and-slow control valves 61FL, 61FR, 61 R which have the same structure with each other and increasing-and-decreasing control valves 62FL, 62FR, 62R which have the same structure with each other are respectively kept to the deenergized states and, in response to the braking of the motor vehicle by the vehicle driver, the braking hydraulic pressure from a master cylinder 9 is supplied through cut valves 60FL, 60FR, 60R, which have the same structure with each other, to braking devices (not shown) for the respective wheels 10FR, 10FR, 10RL, 10RR. Here, the flow of the hydraulic pressure in each of the cut valves 60FL, 60FR, 60R advances through a chamber 60A, a chamber 60B, a chamber 60C and a chamber 60D in sequence. On the other hand, when an electronic control unit 80 (corresponding to the control unit 16 in the first-mentioned embodiment) has determined that the wheel or wheels 10FL to 10RR are in the locked states due to a rapid braking operation, the electronic control unit 80 controls the rapid-and-slow control valve or valves 61FL to 61R and the increasing-and-decreasing control valve or valves 62FL to 62R so as to results in a rapid-decreasing mode. In the rapid-decreasing mode, the rapid-and-slow control valves 61FL to 61R are maintained as it are and only the increasing-and-decreasing control valves 62FL to 62R are energized so as to respectively take positions b (FIG. 5) from positions a taken in the normal states, i.e., deenergized state, whereby the braking pressures in wheel cylinders (illustrated by character W/C in FIG. 5) of the above-mentioned braking devices are rapidly decreased by means of the actions of the cut valves 60FL, 60FR, 60R. That is, in each cut valve, a decreasing piston 60E is fallen down so that a ball valve 60G cuts off the connumication between the chambers 60A and 60B to rapidly increase the volume of the chamber 60B, resulting in decrease in the wheel cylinder pressure by a value corresponding to the volume increase of the chamber 60B. In the case of a slow-decreasing mode, the electronic control unit 80 energizes both the rapid-and-slow control valves 61FL to 61R and the increasing-and-decreasing control valves 62FL to 62R. In response to the energization, the rapid-and-slow control valves 61FL to 61R are respectively switched from normal (deenergized) positions a to positions b, whereby the volume of the chamber 60B of each of the cut valves 60FL to 60R is slowly increased so as to slowly decrease the braking pressure in the wheel cylinder by a value coresponding to the volume increase of the chamber 60B.

On the other hand, in the case of the rapid increasing mode, both the rapid-and-slow control valves 61FL to 61R and the increasing-and-decreasing control valves 62FL to 62R are deenergized to take the positions a. Thus, the pressure of an accumulator regulated by means of a regulator 69 to be substantially equal to the pressure in the master cylinder 9 is rapidly applied to the decreasing piston 60E of each cut valve (60) which in turn rises so that the volume of the chamber 60B is rapidly decreased to cause the pressure of the wheel cylinder to increase by a value corresponding to the volume decrease. In the case of the slow-increasing mode, only the rapid-and-slow control valves 61FL to 61R are energized to take the positions b and the increasing-and-decreasing control valves 62FL to 62R are deenergized to take the positions a, whereby the braking pressures therein are slowly increased.

The above-mentioned four modes are selectively effected in accordance with the slip ratio of each wheel to prevent the wheel locking and further to assume an appropriate braking distance. In FIG. 5, the reference numeral 68 represents a proportioning valve.

On the other hand, in response to occurrence of slip of at least one driven wheel 10RL, 10RR, the electronic control unit 80 energizes a master cylinder cut valve 66, a main control valve 64 and a subcontrol valve 65 each of which in turn takes a position b in FIG. 5. Thus the hydraulic pressure in the accumulator 46 is supplied into a cylinder 67 to cause a piston 67a to move to the right direction in FIG. 5 to indirectly increase the braking pressure in the braking devices applied to the driven wheel 10RL or 10RR. In response to reduction of the wheel slipping, the main control valve 64 and the subcontrol valve 65 are respectively deenergized so as to take positions a, whereby the braking pressure in the braking devices are indirectly decreased. Furthermore, when the main control valve 64 is deenergized to take the position a and the subcontrol valve 65 is energized to take the position b, the braking pressure in the braking devices can be kept indirectly to a constant value.

On the anti-skid control, the electronic control unit 80 integrates the time period of execution of the rapid-decreasing mode in which the increasing-and-decreasing control valve 62 is energized and the rapid-and-slow control valve 61 is deenergized, the time period of the rapid-decreasing mode execution corresponding to the consumption time of the accumulator 46 pressure. If the integrated time period exceeds a predetermined time, the electronic control unit 80 outputs a drive signal to the motor 43 to cause the pressure of the accumulator 46 to increase. Furthermore, on the slip control, the electronic control unit 80 integrates the time period of energizing the master cylinder cut valve 66, main control valve 64 and subcontrol valve 65, as the consumption time of the accumulator pressure. When the second-mentioned integrated time period becomes above a predetermined time period, the electronic control unit 80 drives the motor 43 to increase the pressure of the accumulator 46. Here, similarly, if the lowing of the accumulator pressure is measured by means of the pressure sensor 45, the electronic control unit 80 outputs a drive signal to drive the motor 43 to increase the pressure thereof.

Figure 6:
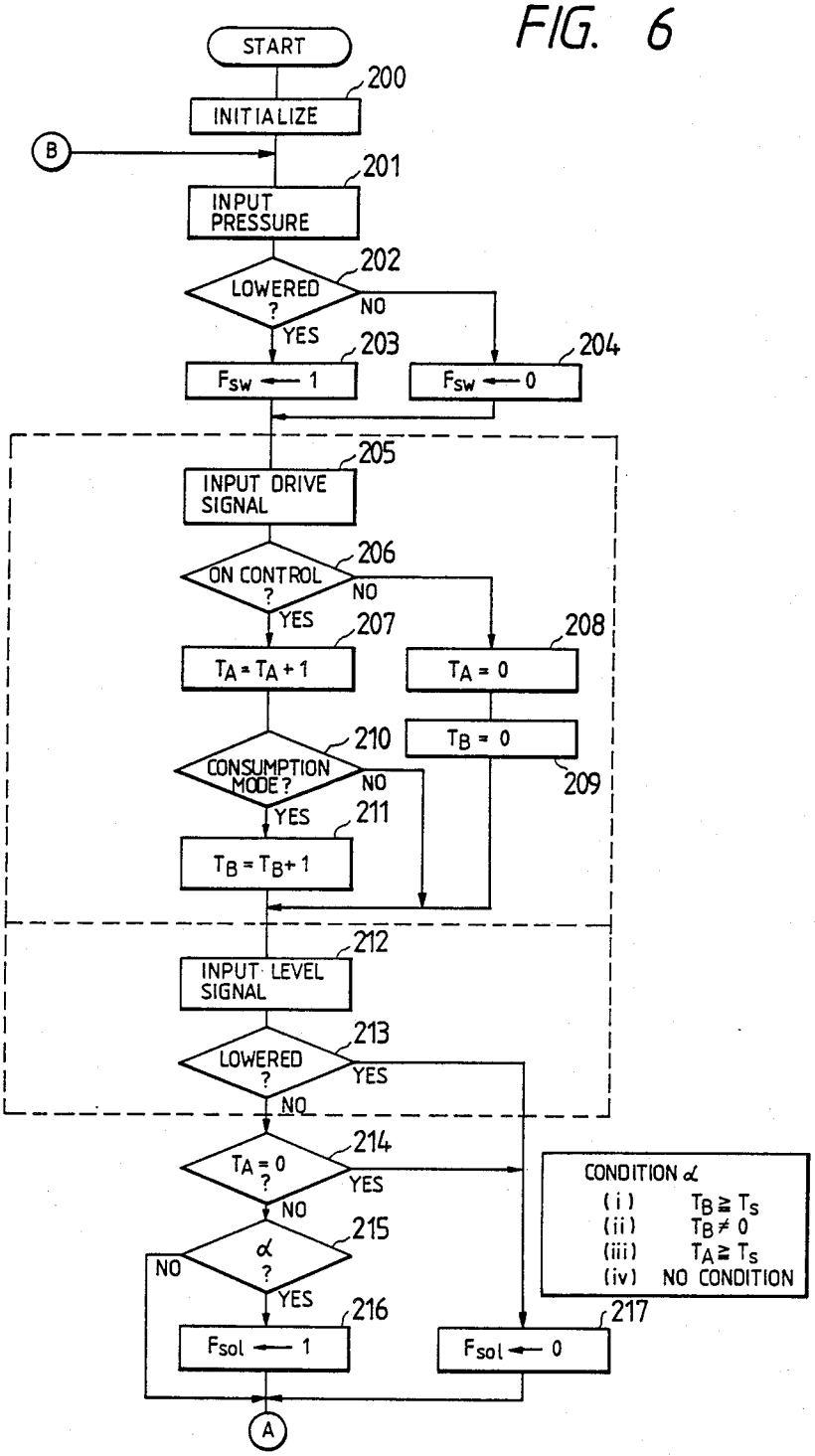
FIGS. 6 and 7 are flow charts showing operation excited by an electronic control unit of the accumulator pressure control apparatus of the second embodiment of this invention.
Figure 7:
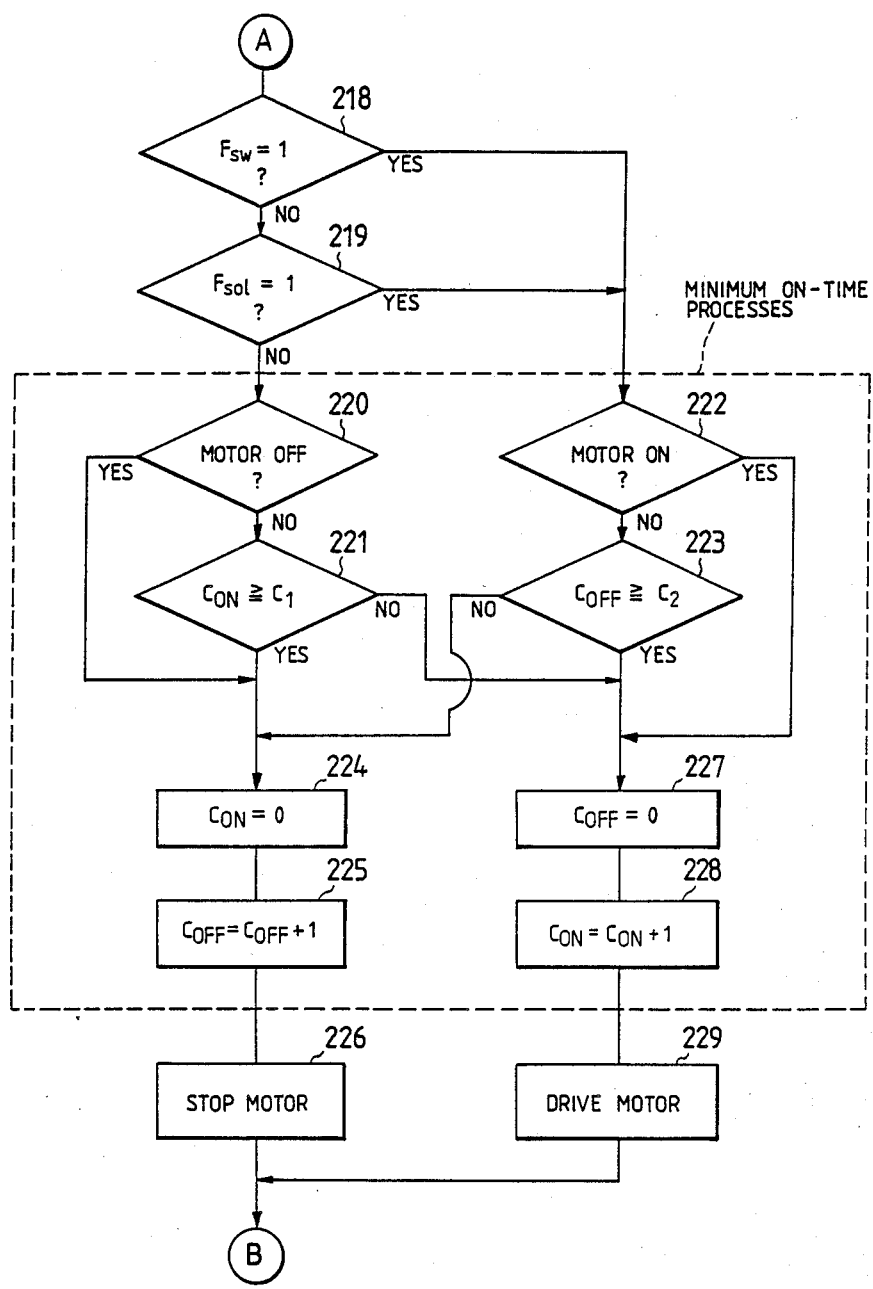

FIGS. 6 and 7 are flow charts for describing the processes executed in the electronic control unit 80 on the accumulator pressure control. In FIG. 6, the operational flow starts with a step 200 to perform the initialization, followed by a step 201 to input a pressure signal from the pressure sensor 45 indicative of the accumulator 46 pressure. Thereafter, control goes to a step 202 to check whether the accumulator pressure measured by the pressure sensor 45 is lower than a predetermined value P2. If so, a step 203 follows to set a flag Fsw to "1". If not, a step 204 follows to set the flag Fsw to "0". Here, the flag Fsw is for showing the requirement of the motor drive based upon the pressure signal from the pressure sensor 45.

The following stepts 205 to 211 are provided in order to calculate, or integrate, the continuation time periods of executions of the anti-skid control and the slip control, or the consumption time period of the accumulator pressure. In the step 205, the drive signals to the control valves are inputted in order to check the energizing states of the increasing-and-decreasing control valves 62 and rapid-and-slow control valves 61. The step 205 is followed by the step 206 in which it is checked whether the motor vehicle is on the anti-skid control or slip control. Here, the anti-skid control performing state means that, for example, the wheel speed and wheel acceleration are under predetermined conditions and the slip control performing state means that the wheel is under a predetermined slip condition. The wheel speed may be obtained by means of a wheel speed sensor (not shown) and the wheel acceleration may be calculated on the basis of the obtained wheel speed and further the wheel slip condition may be obtained on the basis of the wheel speed. If the decision of the step 206 is "NO", the steps 208 and 209 are successively executed so as to reset a control timer $T_A$ and a consumption timer $T_B$ to zero, respectively. The control timer $T_A$ is used for counting the integrated time after the start of the anti-skid control or slip control and the consumption timer $T_B$ is used for counting the integrated consumption time during which the accumulator pressure is under the consumption condition. If the the decision of the step 206 is "YES", the step 207 follows to increment the control 20 timer $T_A$ and then the step 210 follows to check whether the motor vehicle is in the consumption mode. The consumption mode means that, in the case of the anti-skid control, the increasing-and-decreasing control valves 62 are in the energized states and the rapid-and-slow control valves 61 are in the deenergized states and, in the case of the slip control, the master cylinder cut valve 66, main control valve 64 and subcontrol valve 65 are respectively in the energized states. If it is in the consumption mode, the step 211 follows to increment the consumption timer $T_B$.

Thereafter, the control advances to steps 212 and 213 for countermeasures against the air introduction into the accumulator 46. That is, when the pump 42 is driven under the condition that the oil level in the reservoir 44 is lowered, air tends to be introduced into the accumulator 46, and therefore it is required to prevent this air introduction thereinto. In the step 212, the electronic control unit 80 inputs a signal from the braking liquid level switch 81 which is provided in the reservoir 44, and in the step 213, it is checked whether the liquid level of the reservoir 44 is lowered below a predetermined value. If so, a step 217 follows so as to set a flag Fsol to zero to inhibit the motor drive. The flag Fsol is used for requiring the motor drive under the condition that the accumulator pressure is consumed. On the other hand, if the liquid level of the reservoir 44 is in the normal state, a step 214 follows in order to check whether the count value of the control timer $T_A$ is zero. If it is zero, since the anti-skid control is not executed, the control goes to the above-mentioned step 217. If on the anti-skid control, a step 215 is executed to check predetermined conditions α, that is, (i) whether the integrated consumption time counted by the consumption timer TB is over a predetermined value Ts, i.e., $T_B > T_s$, (ii) whether the consumption timer $T_B$ is started (the accumulator pressure is started to be consumed), i.e., $T_B$ is not zero, (iii) whether the integrated elapse time after start of the anti-skid control is over the predetermined value Ts, i.e., $T_A > T_s$. Here, the predetermined value Ts may be set to about 100 ms which is relatively short. If at least one of the predetermined conditions α is satisfied, a step 216 follows to set the flag Fsol to "1". It is also appropriate that, irrespective of the predetermined conditions α, the step 216 is executed when the anti-skid control is started, that is, when the decision of the step 214 is "NO".

Thereafter, the step 216 is followed by steps 218 and 219 shown in FIG. 7. The steps 218 and 219 are provided to check whether the flag Fsw associated with the pressure switch is "1" and whether the flag sol associated with the accumulator pressure consumption is "1". If either of them is "1", control is performed for the motor drive. If both are not "1", control is effected for motor stop. In steps 220 to 228, under the condition that a predetermined minimum continuation time period is elapsed after the motor drive, the motor 43 is stopped, and under the condition that a predetermined time period is elapsed after the motor stop, the motor 43 is driven. This is for the purpose of preventing the chattering. In the case of the stop of the motor 43, the step 220 is first executed to check whether the motor 43 is in the stopped state. If not, that is, if the motor 43 is in the driven state, the step 221 follows to check whether the count value Con of an ON-counter is over a predetermined time C1, i.e., Con>C1. The predetermined time C1 represents the minimum time for which the motor 43 is to be continuously driven after the motor drive. If Con≧C1, the step 224 follows to set the ON-counter Con to zero and the step 225 is then executed to increment an OFF-counter Coff by one, followed by a step 226 to step the motor drive. Until Con exceeds C1, the step 221 is followed by a step 227 to set the OFF-counter Coff to "0" and then followed by a step 228 to increment the ON-counter Con by one and further followed by a step 229 to continue the motor drive.

On the other hand, in the case of driving the motor 43, similarly, a step 222 is first executed in order to check whether the motor 43 is the ON-state. If not, a step 223 follows to check whether the OFF-counter Coff is over a predetermined time C2. The predetermined time C2 is the time for which the motor is to be continuously stopped after the stop of the motor 43. Until Coff becomes greater than C2, the steps 224, 225 and 226 are successively executed so as to stop the motor drive. If Coff≧C2, the steps 227, 228 and 229 are successively executed so as to drive the motor 43.

Figure 8:
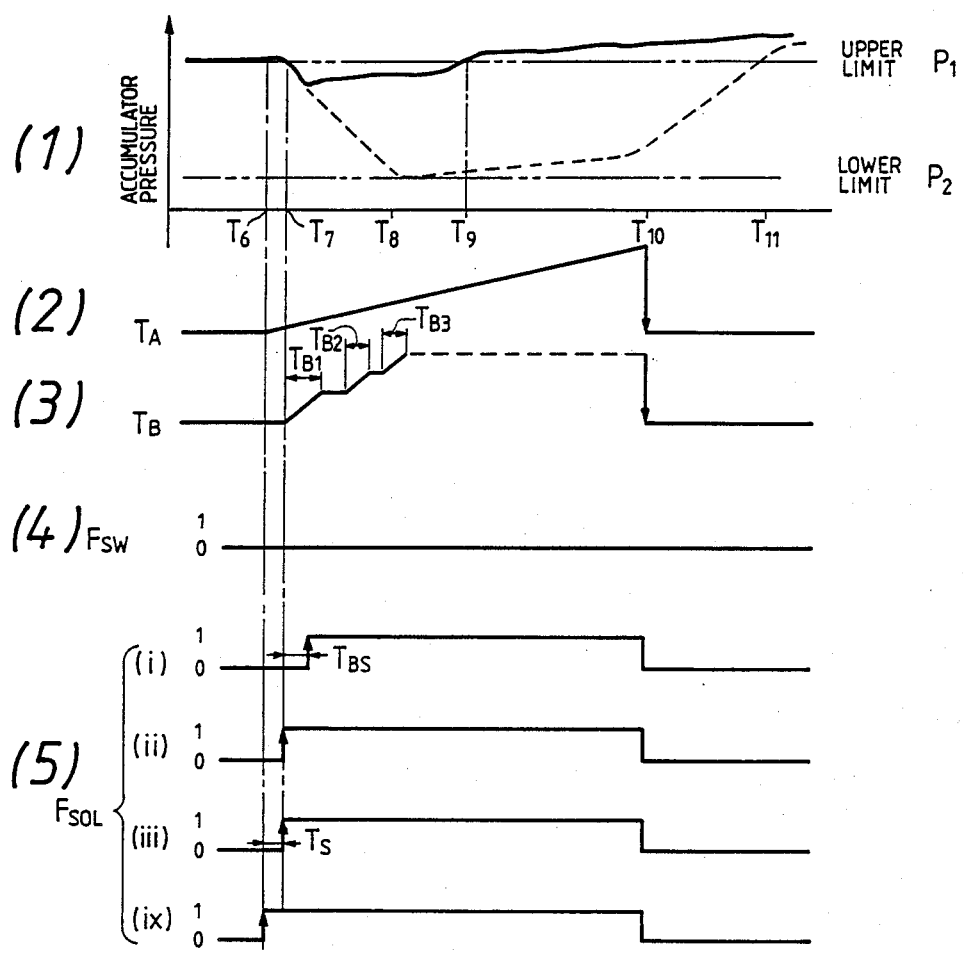
FIG. 8 is a graphic illustration for describing the effect of the accumulator pressure control apparatus of the second embodiment.

FIG. 8 is a graphic diagram useful for understanding the effect of the above-mentioned processes described with reference to FIGS. 6, 7 flow charts. (1) of FIG. 8 shows the variation of the accumulator pressure with respect to the time passage and a solid line represents the case of the above-mentioned embodiment of this invention and a dotted line designates the case of a conventional system effected by only the pressure sensor. In FIG. 8, the reference T6 represents the time at which the anti-skid control or the slip control is started, T7 designates the time at which the consumption mode where the accumulator pressure is consumed is made, T8 is the time at which the accumulator pressure reaches the lower limit P2 (the prior system), T9 and T11 are the times at which the accumulator pressure exceeds the upper limit P1 (this embodiment and the prior system), and T10 depicts the time at which the anti-skid control is terminated. In this embodiment, the control timer $T_A$ is started at the anti-skid control start time T6 and then, after the time T7 at which the consumption mode is made, the consumption timer TB successively counts the times $T_{B1}$, $T_{B2}$, $T_{B3}$ of the consumption modes. Here, as indicated by (i) of (5) in FIG. 8, in response to the count value of the consumption timer $T_B$ exceeding a predetermined value $T_{BS}$, the flag Fsol is set to "1" so as to drive the motor 43. (ii) and (iii) of (5) show the cases of the above-mentioned other conditions α, and (iv) represents the case that the flag Fsol is set to "1" under no condition o, i.e., when the anti-skid control is started, for example. In all cases, the flaf Fsol is set to "0" at the time T10 and the control timer $T_A$ is reset to zero thereat so as to stop the motor 43.

Unlike the prior system, in this embodiment, the motor 43 is driven before the time T8 at which the accumulator pressure becomes below the lower limit P2 and stopped before the time T11 at which the accumulator pressure exceeds the upper limit P1, resulting in preventing the occurrance of noises caused by the motor drive.

Figure 9:
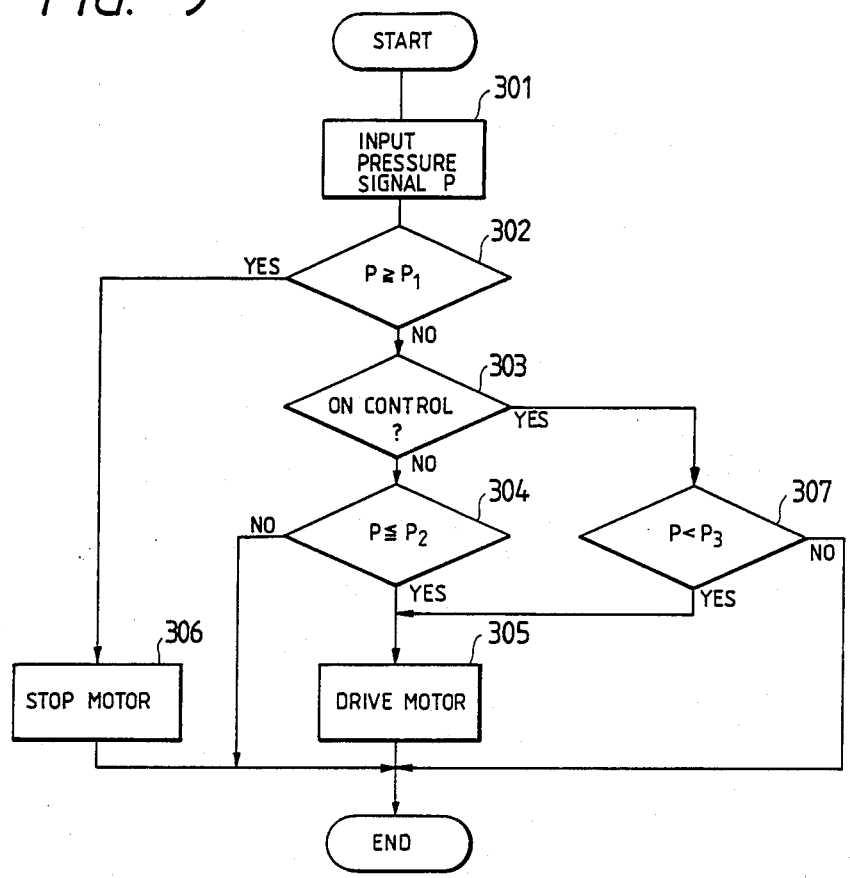
FIG. 9 is a flow chart for describing the process of an accumulator pressure control apparatus according to a third embodiment of the present invention.
Figure 10:
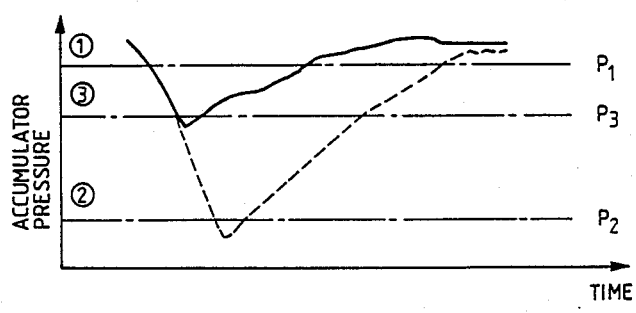
FIG. 10 is a graphic illustration for a better understanding of the accumulator pressure control apparatus of the third embodiment.

A third embodiment of this invention will be described hereinbelow with reference to FIGS. 9 and 10. One important feature of the third embodiment is that, for the pump drive control, the accumulator pressure is compared with the lower limit P2, upper limit P1 and a middle reference value P3 (P1>P3>P2). More specifically, as indicated by a solid line of FIG. 10, on the anti-skid control, when the accumulator pressure becomes below the middle reference value P3, the pump 42 is started. On the other hand, if the anti-skid control is not performed, as indicated by a dotted line in FIG. 10, the pump 42 is driven when the accumulator pressure becomes below the lower limit P2. That is, in this case, the reference value for the pump drive is changed between the execution of the anti-skid control and no execution thereof. FIG. 9 is a flow chart for describing the processes of the third embodiment. A step 301 is initially executed to input a pressure signal P indicative of the accumulator pressure from the pressure sensor 45, followed by a step 302 to check whether the accumulator pressure is over the upper limit P1, i.e., P≧P1. If not, a step 303 follows to check whetehr the motor vehicle is on the anti-skid control. If so in the step 303, a step 307 is executed to check whether the pressure signal P is lower than the middle reference value P3, i.e., P<P3. If P P3, a step 305 follows to output a motor drive signal. On the other hand, if the decision of the step 303 is "NO", the operational flow goes to a step 304 to check whether the pressure signal P is lower than the lower limit P2. If P <P2, control goes to the step 305 to drive the motor 43. Returning back to the step 302, if P≧P1, control goes to a step 306 to stop the motor 43. The third embodiment can quicken the completion of the accumulator pressure increase and quickly stop the noises in connection with the termination of the anti-skid control.

Figure 11:
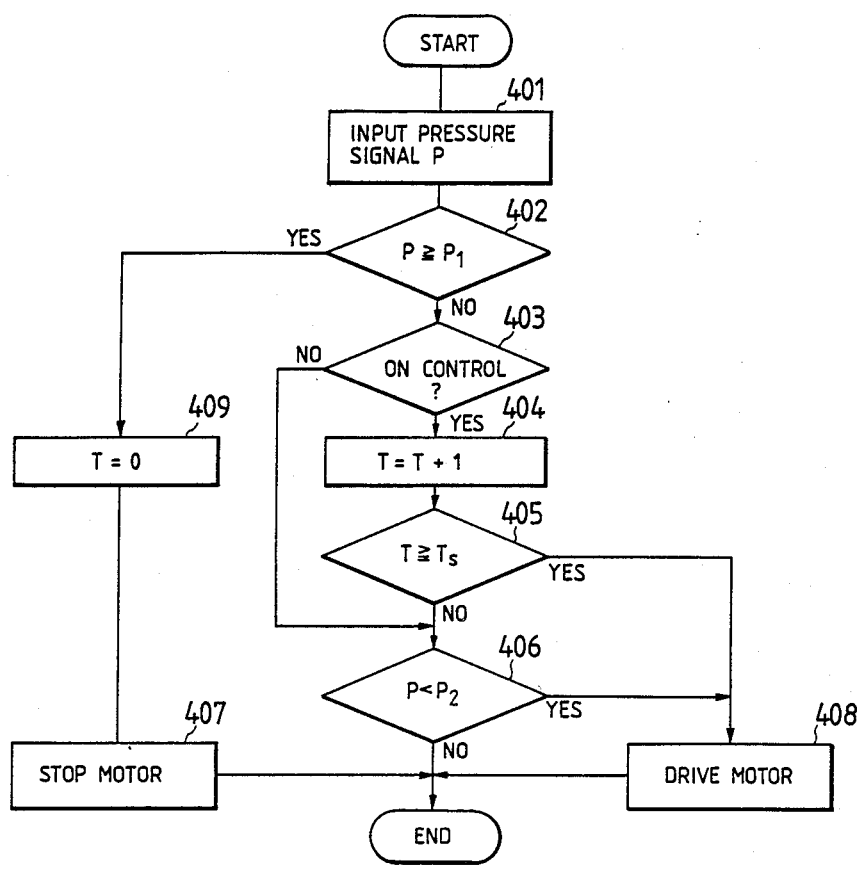
FIG. 11 is a flow chart for describing the processes of an accumulator pressure control apparatus according to a fourth embodiment of the present invention.
Figure 12:
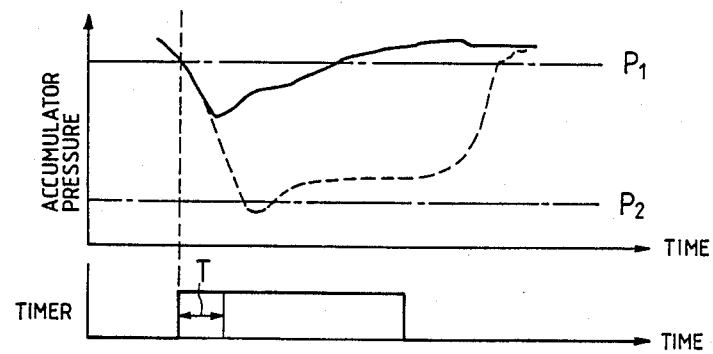
FIG. 12 is a graphic illustration for a better understanding of the accumulator pressure control apparatus of the fourth embodiment.

A fourth embodiment of this invention will be described hereinbelow with reference to FIGS. 11 and 12. One important feature of the fourth embodiment is that, in the normal state, the accumulator pressure is compared with the upper limit P1 and the lower limit P2 and, on the anti-skid control, when the elapse time T after the start of the anti-skid control exceeds a predetermined time Ts, the pump 42 is started. In FIG. 11, the operation of the fourth embodiment starts with a step 401 to input a pressure signal P from the pressure sensor 45, followed by a step 402 in which the pressure signal P is compared with the upper limit P1. If P is lower than P1, a step 403 follows to check whether the motor vehicle is on the anti-skid control. If the decision of the step 403 is "YES", the elapse time T measured by a timer is incremented in a step 404 which is in turn followed by a step 405 to check whether the elapse time T is over the predetermined time Ts. If T≧Ts, a step 408 follows to drive the motor 43. On the other hand, in the case of no execution of the anti-skid control or when the decision of the step 405 is "NO", a step 406 is executed to check whether the pressure signal P is compared with the lower limit P2. If P<P2, control goes to the step 408 to drive the motor 43. Returning back to the step 402, if P≧P1, a step 409 follows to set the timer to zero, followed by a step 407 to stop the motor drive. In FIG. 12, a solid line shows the variation of the accumulator pressure on the anti-skid control and a dotted line represents the variation of the accumulator pressure when the anti-skid control is not performed.

It should be understood that the foregoing relates to only preferred embodiments of the present invention, and it is intended to cover all changes and modifications of the embodiments of this invention herein used for the purposes of the disclosure, which do not constitute departures from the spirit and scope of the invention.

What is claimed is:

1. A braking system for use in a motor vehicle, comprising:
   accumulator means coupled to motor-driven pump means for accumulating a hydraulic pressure which is supplied to a braking device to brake a wheel of said motor vehicle;
   control valve means provided between said accumulator means and said braking device for regulating the hydraulic pressure to be applied from said accumulator to said braking device; and
   control means for controlling said control valve means so as to regulate the hydraulic pressure to said braking device, said control means controlling said motor-driven pump means on the basis of the control time of said control valve means.

2. A braking system as claimed in claim 1, further comprising pressure sensor means for sensing the hydraulic pressure in said accumulator means and generating a signal indicative of the sensed hydraulic pressure, and wherein said control means is responsive to said pressure indicating signal from said pressure sensor means for energizing said motor-driven pump means when the hydraulic pressure in said accumulator becomes below a first predetermined value and for deenergizing it when the hydraulic pressure therein reaches a second predetermined value.

3. A braking system as claimed in claim 1, wherein said control means integrates the control time of said control valve means and energizes said motor-driven pump means when the integrated control time is over a predetermined time.

4. A braking system as claimed in claim 1, further comprising means for detecting a condition of said wheel, and wherein said control means controls said control valve means in response to the detection of said wheel condition.

5. A braking system as claimed in claim 4, wherein said control valve means is adapted to assume predetermined pressure control modes for the hydraulic pressure control in accordance with the detected wheel condition and said control means energizes said motor-driven pump means when the execution time of one of said predetermined modes is over a predetermined time.

6. A braking system as claimed in claim 2, further comprising means for detecting a condition of said wheel and generating a signal indicative of the wheel condition, and wherein said control means is responsive to said wheel condition indicating signal for energizing said motor driven-pump means when the sensed hydraulic pressure in said accumulator means is below a third predetermined value which is higher than said first predetermined value.

7. A control system for controlling pressure of an accumulator for a braking apparatus for use in a motor vehicle having at least one wheel, said braking apparatus operating to adjust a braking force applied to said wheel, said control system comprising:
   accumulator means for accumulating an operation liquid;
   pump means for supplying pressurized liquid to said accumulator means;
   control valve means provided between said braking apparatus and said accumulator for controlling said operation liquid supplied form said accumulator to said braking apparatus;
   pressure detection means for detecting the pressure of said accumulator and outputting a pressure signal indicative thereof;
   first drive control means for outputting a first drive signal to drive said pump means in accordance with said pressure signal when the pressure of said accumulator is below a predetermined value; and second drive control means for detecting a consumption condition for consumption of the pressure of said accumulator before the pressure of said accumulator falls below said predetermined value and outputting a second drive signal to drive said pump means.

8. A control system a s claimed in claim 7, wherein said consumption condition is that an integrating consumption time of the accumulator pressure exceeds a predetermined time.

9. A control system as claimed in claim 7, wherein said consumption condition is that said control valve means enters into a consumption mode for consuming the pressure of said accumulator.

10. A control system as claimed in claim 7, wherein the consumption condition is that a predetermined time is elapsed after said control valve means enters into a consumption mode for consuming the pressure of said accumulator.

11. A control system as claimed in claim 7, wherein said braking apparatus is arranges to perform anti-skid control for repressing a locking of said wheel during a braking operation of said motor vehicle and/or to perform anti-slip control for repressing a spin of said wheel during acceleration of motor vehicle, said control valve means is arranges to supply a requires braking pressure from said accumulator to said braking apparatus during control of said anti-skid and/or anti-slip control.

12. A control system as claimed in claim 11, wherein said consumption condition is that, after start of said anti-skid or anti-slip control, an integrating time during which said control valve means is in a consumption mode for allowing the pressure of said accumulator to be consumes exceeds a predetermined value.

13. A control system as claimed in claim 11, wherein said consumption condition is that said control valve means enters into a consumption mode for allowing the pressure of said accumulator to be consumed, after start of said anti-skid or anti-slip control.

14. A control system as claimed in claim 11, wherein said consumption condition is that an elapse time after start of said anti-skid or anti-slip control exceeds a predetermined value.

15. A control system as claimed in claim 11, wherein said consumption condition is the time of start of said anti-skid or anti-slip control.

* * * * *